United States Patent
Macy et al.

(10) Patent No.: US 6,646,681 B1
(45) Date of Patent: Nov. 11, 2003

(54) METHOD FOR REDUCING ROW NOISE FROM IMAGES

(75) Inventors: William Macy, Palo Alto, CA (US); Ajaya Durg, Hillsboro, OR (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 09/291,700

(22) Filed: Apr. 14, 1999

(51) Int. Cl.[7] .......................... H04N 5/217; G06K 9/00; G06K 9/38; G06K 9/40; G06K 7/00
(52) U.S. Cl. .......................... 348/241; 382/172; 382/275; 382/312; 382/254
(58) Field of Search .......................... 348/241; 382/172, 382/275, 312, 254

(56) References Cited

U.S. PATENT DOCUMENTS

| | | | |
|---|---|---|---|
| 5,065,444 A | * 11/1991 | Garber | 382/275 |
| 5,881,182 A | * 3/1999 | Fiete et al. | 382/275 |
| 6,133,862 A | * 10/2000 | Dhuse et al. | 341/118 |

* cited by examiner

*Primary Examiner*—Wendy R. Garber
*Assistant Examiner*—James Hannett
(74) *Attorney, Agent, or Firm*—Blakely, Sokoloff, Taylor & Zafman LLP

(57) ABSTRACT

A method for reducing row noise from a complementary metal oxide semiconductor (CMOS) image sensor is disclosed. The method includes determining a set of row sums for a set of pixel rows in the image sensor and a set of corresponding contributing pixel counts. Then, determining a set of row offset corrections. Finally, adjusting the set of pixel rows by the set of row offset corrections.

21 Claims, 6 Drawing Sheets

$$S[i-m] = S_j^{nc} X[i-m,j]$$

$$\vdots$$

$$S[i-1] = S_j^{nc} X[i-1,j]$$
$$S[i] = S_j^{nc} X[i,j]$$
$$S[i+1] = S_j^{nc} X[i+1,j]$$

$$\vdots$$

$$S[i+m] = S_j^{nc} X[i+m,j]$$

X  X  X  X[i-m, k]  X  X  X  X  X

X  X  X  X[i-1, k]  X  X  X  X  X
      X  X[i, k]    X
      X  X[i+1, k]  X

X  X  X  X[i+m, k]  X  X  X  X  X

METHOD FOR REDUCING ROW NOISE FROM IMAGES

FIELD OF THE INVENTION

This invention is related to the field of use of image processing. More particularly, this invention is directed to a method for reducing row noise from complementary metal oxide semiconductor (CMOS) sensors.

BACKGROUND

Video and still image capture using a digital camera has become very prevalent. Video capture may be used for such applications as video conferencing, video editing, and distributed video training. Still image capture with a digital camera may be used for such applications as photo albums, photo editing, and compositing. Many components of hardware and software need to work seamlessly to both get the video data (also referred to as a video "stream") or the still image data from the hardware through the various layers of software on the personal computer (PC) and made visible on a display medium such as a monitor.

In digital cameras, a light sensitive sensor is used to capture the image that is formed on an array of light sensitive elements on the sensor through the use of a lens. Each light sensitive element on the sensor generates signals in response to the portion of the image to which it is exposed, and outputs these signals for storage or processing by post-capture circuitry. One type of sensor that is used in cameras is based on charge-coupled device (CCD) technology. Another type of sensor that may be used is based on a complementary metal oxide semiconductor (CMOS) technology. CCD sensors have been on the market for a longer period of time than CMOS sensors, but as it is generally easier to provide additional circuits on the same substrate on which the CMOS sensor is formed, CMOS sensors are becoming more popular.

CMOS sensors suffer from row noise, which manifests itself in forms of light or dark stripes appearing at different locations in any captured images. The position of these stripes are not the same from one frame to the next. Thus, in a sequence of frames captured by a CMOS sensor, such as in a video sequence, stripes will appear at random during playback of the displayed image. Similarly, in a series of captured images where each captured image is a "still" image, row noise appears at different positions from one image to the next. This row noise typically is caused by a random amount that is added to the intensities of the pixels for each row in a captured image. These random amounts, whether positive or negative, are referred to as random offsets.

The row noise described above is different from fixed pattern noise, which is noise that appear in the same position in every frame or captured image. For example, a single light sensing element (i.e., a pixel) in a CMOS sensor may be deficient in its sensitivity or output level, which produces a consistent undervalued output for that pixel location in each captured image. These fixed pattern noises may be detected and compensated for either during the manufacturing process or during the post processing of captured images. Row noise cannot typically be corrected during the manufacturing process, so other means must be used to correct them.

SUMMARY

A method including determining a set of row sums for a set of pixel rows and a set of corresponding contributing pixel counts. The method also including determining a set of row offset corrections; and, adjusting the set of pixel rows by the set of row offset corrections.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

The present invention provides a system for reducing row noise from complementary metal oxide semiconductor sensors. The system attempts to seeks out and remove all random offsets that are added to pixels in a row, the random offsets causing the row noise.

Figure 1:
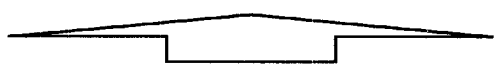
FIG. 1 is a diagram illustrating one portion of the process for determining the correction values for an image.

FIG. 1 is a diagram illustrating one portion of the process for determining the correction values for an image. A series of rows of pixel intensity values (each pixel represented by an "X") are shown in FIG. 1, with a corresponding row sum $S(n)$ being generated for each row being shown on the right. The superscript "nc" of the summation symbol represents the number of pixels in the rows which contribute to the row sum. The system assumes that differences in row sums are due to differences in row noise. A threshold test is used to detect and reduce the introduction of artifacts by the system where the difference in row sums are due to the presence of a feature in the image such as a horizontal line. Based on these threshold tests, an offset correction is calculated and applied to each row in the image.

Figure 2:
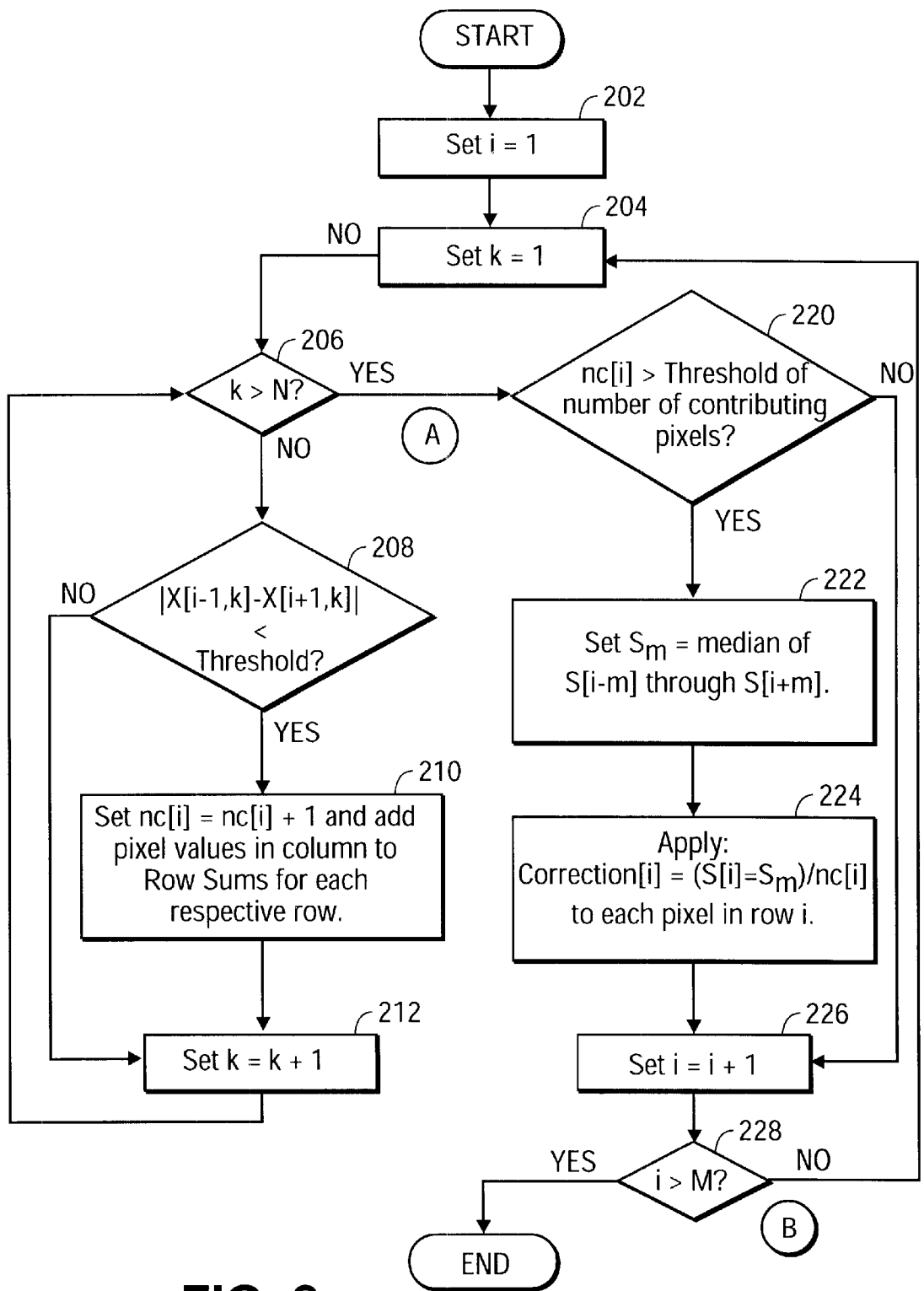
FIG. 2 is a flow diagram illustrating the operation of the system configured in accordance with one embodiment of the present invention.

FIG. 2 is a flow diagram illustrating a process for removing random offsets in an image with a size of M rows by N columns. The image has an intensity matrix, a portion of which is shown in FIG. 1, with individual values in the matrix being identified using a set of coordinates i and k (e.g., $X[i,k]$).

In block 202, i is set to one. Operation then continues with block 204, where k is set to one. Operation then continues with block 206.

In block 206, k is compared to N. If k is greater than N, which would indicate that the last pixel of row i of the image has been processed, then operation continues with block 220. Otherwise, operation continues with block 208.

In block 208, it is determined whether the condition:

$$|X[i-1,k]-X[i+1,k]| < \text{threshold}_{video}$$

holds true. This check attempts to determine if the difference between the intensity value of the pixel above row i (e.g., $X[i-1,k]$) and the intensity value of the pixel below row i (e.g., $X[i+1,k]$) is below a threshold amount. If the difference is below the threshold amount, it is likely that the difference is due to offset noise as pixel values from proximate rows are usually fairly close in intensity value and thus the difference is likely caused by offset noise. However, if the difference is above the threshold amount, it would indicate that the difference is due to the presence of a graphical object such as a line in the image. If the difference is below the threshold amount, then operation continues with block 210. Otherwise, operation continues with block 212. The computation is optimized for processing images belonging to a sequence of images, such as from a video sequence.

In block 210, as the difference is below the threshold, as determined in block 208, the intensity value of the current pixel (e.g., X[i,k]) is added to the row sum (e.g., Sum[i]) of contributing pixel intensities (i.e., all pixels for the row that pass the threshold test will contribute pixel intensity values). Also, each pixel in the column from i−m to i+m will contribute to their corresponding row sums. Thus, as shown in FIG. 1, the following row sums are calculated:

$$S(i-m)=S(i-m)+X(i-m)$$
$$\vdots$$
$$\vdots$$
$$S(i-1)=S(i-1)+X(i-1)$$
$$S(i)=S(i)+X(i)$$
$$S(i+1)=S(i+1)+X(i+1)$$
$$\vdots$$
$$\vdots$$
$$S(i+m)=S(i+m)+X(i+m)$$

In addition, a counter that tracks the number of contributing pixel intensities in the row sum (e.g., nc[i]) is increased by one. Operation then continues with block 212.

In block 212, k is increased by one to move the index to the next pixel intensity value. Operation then continues with block 206, which, as discussed above, determines if the last pixel intensity value in the row has been processed. If the last pixel intensity value in the row has been processed, then operation continues with block 220.

At point A, where the transition of the operation goes from block 206 to block 220, the row sums necessary for determining a correction value have been obtained in block 210. Thus, all pixel values in row i has been processed before point A, and a correction value for the pixel values in row i is to be generated after point A.

In block 220, it is determined if the number of contributing pixels found for row i (e.g., nc[i]) during the processing from blocks 202 to 214 is greater than the threshold required for applying a correction to the row.

In block 222, if a correction is to be applied, the median of the row sums of the intensities for rows i−m to i+m (i.e., S(i−m) to S(i+m)) is determined.

In block 224, a correction value (e.g., Correction[i]) is determined for row i by the following formula:

$$\mathrm{Correction}[i]=(S(i)-Sm)/nc[i]$$

and then the correction value is applied to each pixel in the row. In one embodiment, the correction value is subtracted or added only if it is non-zero.

In block 228, i is compared to M. If i is not greater than M, which would indicate that the last row of the image has been processed (i.e., all rows in the image have been processed), then operation continues with block 204, where k is set to one and row i is processed. Otherwise, the complete image has been processed.

At point B, from the transition of block 228 to block 204, the pixel values of row i have been corrected with a correction factor generated by block 224. If there is no correction factor, the next row of pixel values would be processed.

In one embodiment, m is set to be two. Thus, two rows above and two rows below the current row of interest are examined in the process described above. In other embodiments, different values of m may be used in the process described above. Generally, the larger a value that is used for m, the more the number of rows of the image is considered by the system. Thus, for larger values of m, the higher the possibility of rows with irrelevant data being used by the system. Conversely, with a smaller value of m, a smaller the number of rows are being used in the correction system. This can lead to inaccuracies as not enough data is being used to generate a correction value.

Figure 3:
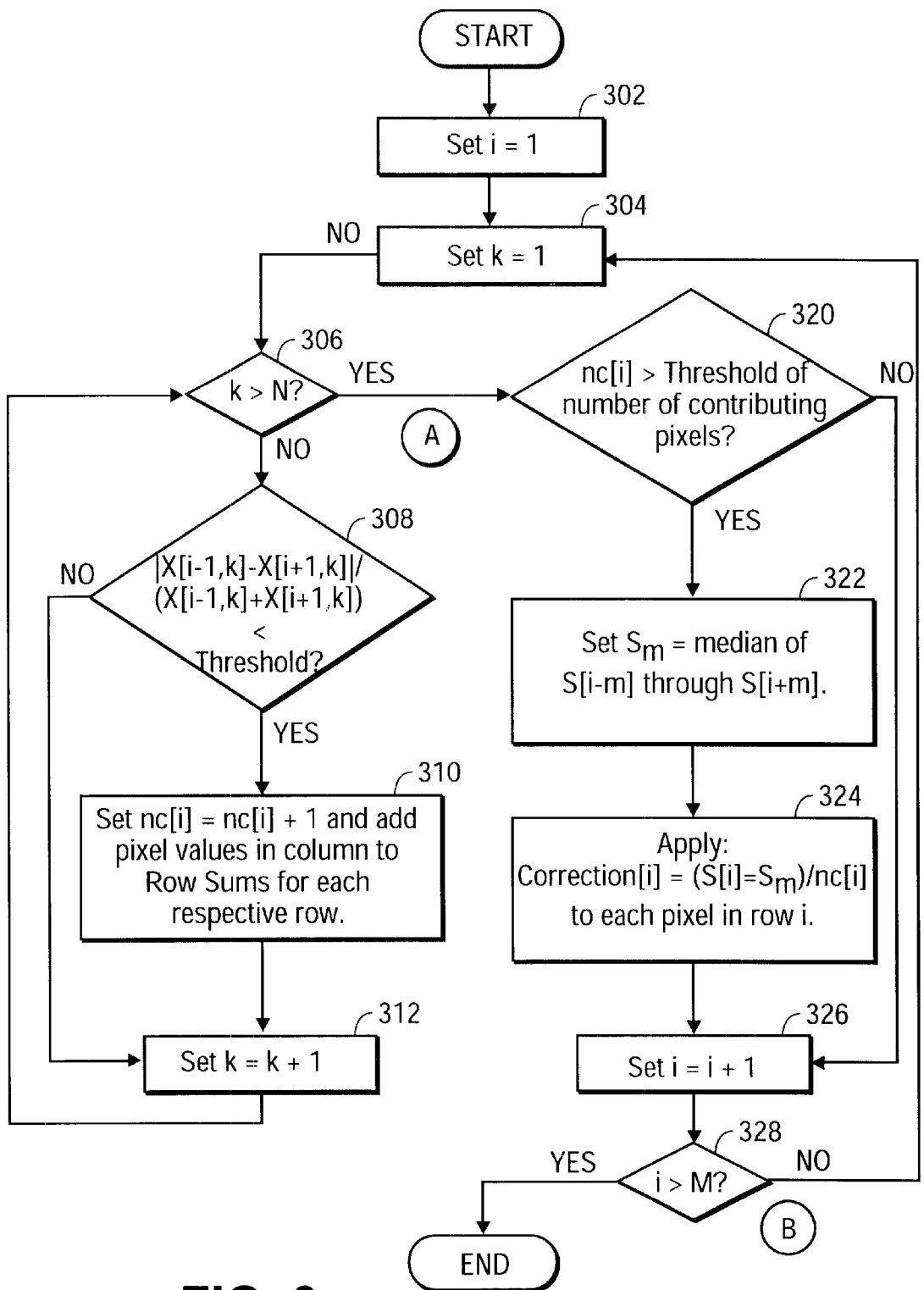
FIG. 3 is a flow diagram illustrating an alternate operation of the system.

FIG. 3 is a flow diagram illustrating an alternate process for removing random offsets in an image with a size of M rows by N columns. The description for each block of the process in FIG. 3 is identical to the description provided above for FIG. 2, with the exception of what is described below for block 308.

In block 308, it is determined whether the condition:

$$|X[i-1,k]-X[i+1,k]|/(X[i-1,k]+X[i+1,k])<\mathrm{threshold}_{still}$$

holds true. This check attempts to determine if the difference between the intensity value of the pixel above row i (e.g., X[i−1,k]) and the intensity value of the pixel below row i (e.g., X[i+1,k]), divided by the sum of the intensities of the pixels, is below a threshold amount (e.g. 0.05). If the difference is below the threshold amount, it is likely that the difference is due to offset noise as pixel values from proximate rows are usually fairly close in intensity value an thus the difference is likely caused by offset noise. However, if the difference is above the threshold amount, it would indicate that the difference is due to the presence of a graphical object such as a line in the image. If the difference is below the threshold amount, then operation continues with block 310. Otherwise, operation continues with block 312. The computation is more resource intensive than the computation described in block 208, which optimized for processing images belonging to a sequence of images, such as from a video sequence. However, the computation in block 308 provides a more accurate measurement of the threshold, and may be used for processing still images. Where computational resource limitations are not a significant factor, the computation in block 308 may be used for video sequences.

Generally, the process in FIG. 2 and FIG. 3 are split into two sections. The first section processes the row to find applicable row sums and the second section processes the row sums to generate and apply a correction value for the row. Thus, each line of the image is processed before moving on to the next.

Figure 4:
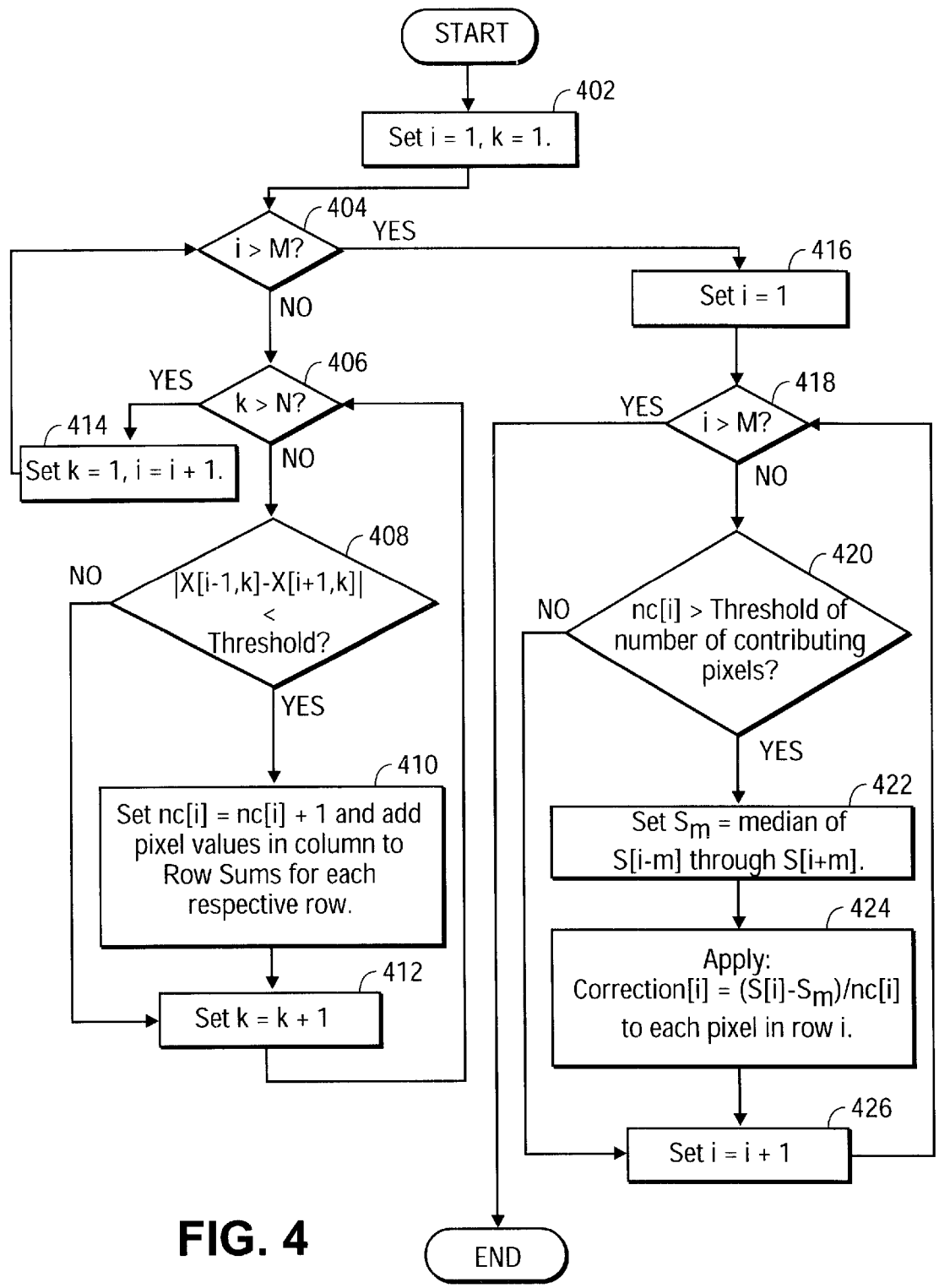
FIG. 4 is a flow diagram illustrating another alternate operation of the system.

FIG. 4 is a flow diagram illustrating an alternate process for removing random offsets in an image with a size of M rows by N columns. The image has an intensity matrix, a portion of which is shown in FIG. 1, with individual values in the matrix being identified using a set of coordinates i and k (e.g., X[i,k]).

In block 402, i and k are set to one. Operation then continues with block 404, where i is compared to M. If i is greater than M, which would indicate that the last row of the image has been processed, then operation continues with block 416. Otherwise, operation continues with block 406.

In block 406, k is compared to N. If k is greater than N, which would indicate that the last pixel of row i of the image has been processed, then operation continues with block 414. Otherwise, operation continues with block 408.

In block 408, it is determined whether the condition:

$$|X[i-1,k]-X[i+1,k]| < threshold_{video}$$

holds true. This check attempts to determine if the difference between the intensity value of the pixel above row i (e.g., X[i−1,k]) and the intensity value of the pixel below row i (e.g., X[i+1,k]) is below a threshold amount. If the difference is below the threshold amount, it is likely that the difference is due to offset noise as pixel values from proximate rows are usually fairly close in intensity value and thus the difference is likely caused by offset noise. However, if the difference is above the threshold amount, it would indicate that the difference is due to the presence of a graphical object such as a line in the image. If the difference is below the threshold amount, then operation continues with block 410. Otherwise, operation continues with block 412. The computation is optimized for processing images belonging to a sequence of images, such as from a video sequence.

In block 410, as the difference is below the threshold, as determined in block 408, the intensity value of the current pixel (e.g., X[i,k]) is added to the row sum (e.g., Sum[i]) of contributing pixel intensities (i.e., all pixels for the row that pass the threshold test will contribute pixel intensity values). Also, each pixel in the column from i−m to i+m will contribute to their corresponding row sums. Thus, as shown in FIG. 1, the following row sums are calculated:

$$S(i-m)=S(i-m)+X(i-m)$$
$$\vdots$$
$$\vdots$$
$$S(i-1)=S(i-1)+X(i-1)$$
$$S(i)=S(i)+X(i)$$
$$S(i+1)=S(i+1)+X(i+1)$$
$$\vdots$$
$$\vdots$$
$$S(i+m)=S(i+m)+X(i+m)$$

In addition, a counter that tracks the number of contributing pixel intensities in the row sum (e.g., nc[i]) is increased by one. Operation then continues with block 412.

In block 412, k is increased by one to move the index to the next pixel intensity value. Operation then continues with block 406, which, as discussed above, determines if the last pixel intensity value in the row has been processed. If the last pixel intensity value in the row has been processed then operation continues with block 414.

In block 414, k is set to one and i is incremented by one. Thus, the next row of pixels is processed as operation continues with block 404. If there is no another row to be processed (i.e., all rows in the image have been processed), as determined in block 404, operation continues with block 416.

In block 416, i is set to one and, in block 418, it is determined if i is greater than M. If i is not greater than M, then operation continues with block 420. Otherwise, all rows in the image have been processed. In block 420, it is determined if the number of contributing pixels found for row i (e.g., nc[i]) during the processing from blocks 402 to 414 is greater than the threshold (e.g. one quarter of a row length) required for applying a correction to the row.

In block 422, if a correction is to be applied, the median of the row sums of the intensities for rows i−m to i+m (i.e., S(i−m) to S(i+m)) is determined.

In block 424, a correction value (e.g., Correction[i]) is determined for row i by the following formula:

$$Correction\ [i]=(S(i)-Sm)/nc\ [i]$$

and then the correction value is applied to each pixel in the row.

In block 426, i is incremented by one to continue processing for the next row. If there is no next row, as determined by block 418, operation then ends.

Figure 5:
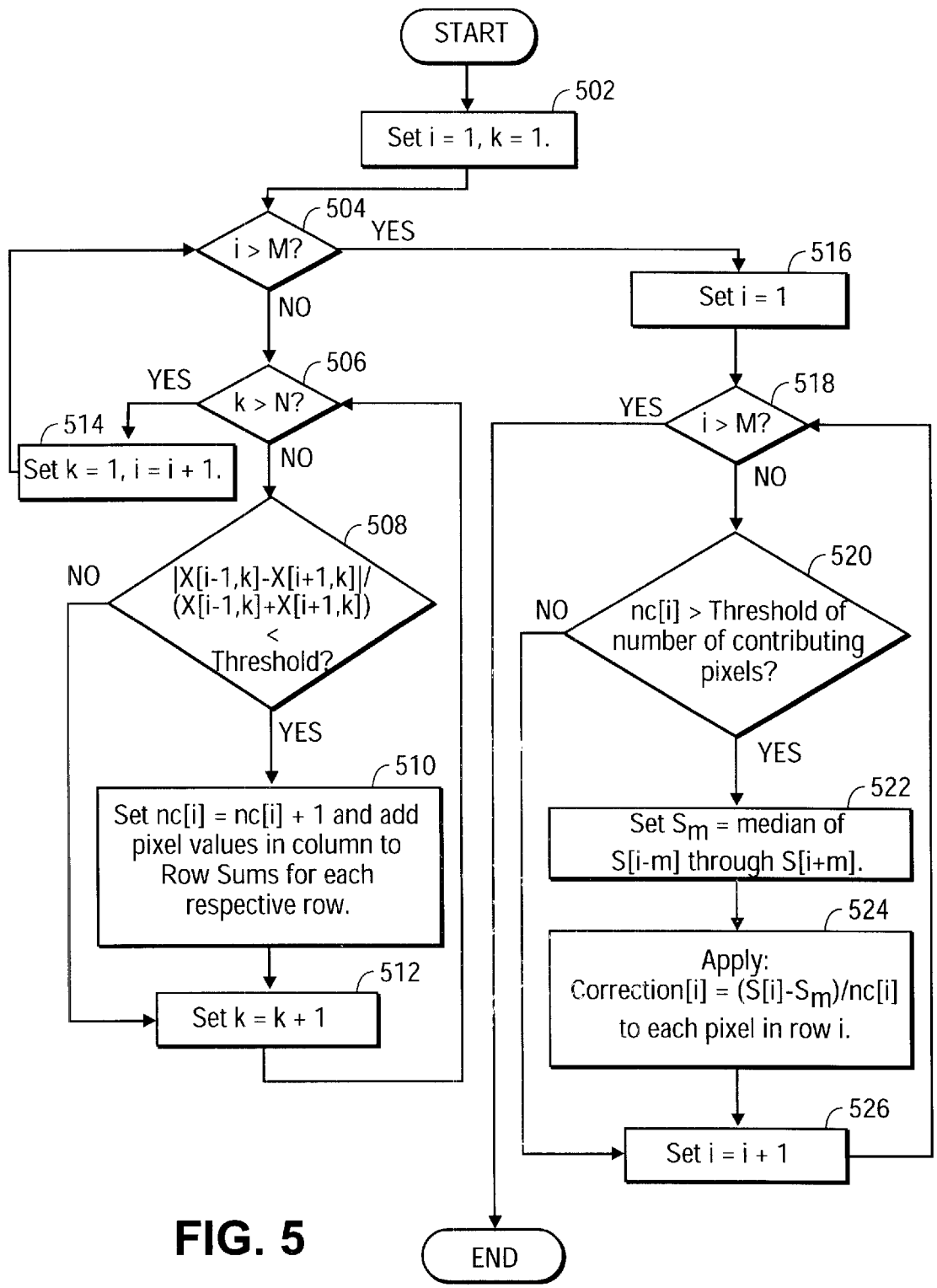
FIG. 5 is a flow diagram illustrating yet another alternate operation of the system.

FIG. 5 is a flow diagram illustrating an alternate process for removing random offsets in an image with a size of M rows by N columns. The description for each block of the process in FIG. 5 identical to the description provided above for FIG. 4, with the exception of what is described below for block 508.

In block 502, i and k are set to one. Operation then continues with block 504, where i is compared to M. If i is greater than M, which would indicate that the last row of the image has been processed, then operation continues with block 516. Otherwise, operation continues with block 506.

In block 506, k is compared to N. If k is greater than N, which would indicate that the last pixel of row i of the image has been processed, then operation continues with block 514. Otherwise, operation continues with block 508.

In block 508, it is determined whether the condition:

$$|X[i-1,k]-X[i+1,k]|/(X[i-1,k]+X[i+1,k]) < threshold_{still}$$

holds true. This check attempts to determine if the difference between the intensity value of the pixel above row i (e.g., X[i−1,k]) and the intensity value of the pixel below row i (e.g., X[i+1,k]), divided by the sum of the intensities of the pixels, is below a threshold amount. If the difference is below the threshold amount, it is likely that the difference is due to offset noise as pixel values from proximate rows are usually fairly close in intensity value and thus the difference is likely caused by offset noise. However, if the difference is above the threshold amount, it would indicate that the difference is due to the presence of a graphical object such as a line in the image. If the difference is below the threshold amount, then operation continues with block 510. Otherwise, operation continues with block 512. The computation is more resource intensive than the computation described in block 408, which optimized for processing images belonging to a sequence of images, such as from a video sequence. However, the computation in block 508 provides a more accurate measurement of the threshold, and may be used for processing still images. Where computational resource limitations are not a significant factor, the computation in block 508 may be used for video sequences.

In block 510, as the difference is below the threshold, as determined in block 508, the intensity value of the current pixel (e.g., X[i,k]) is added to the row sum (e.g., Sum[i]) of contributing pixel intensities (i.e., all pixels for the row that pass the threshold test will contribute pixel intensity values).

Also, each pixel in the column from i−m to i+m will contribute to their corresponding row sums. Thus, as shown in FIG. 1, the following row sums are calculated:

$$S(i-m)=S(i-m)+X(i-m)$$
$$\vdots$$
$$S(i-1)=S(i-1)+X(i-1)$$
$$S(i)=S(i)+X(i)$$
$$S(i+1)=S(i+1)+X(i+1)$$
$$\vdots$$
$$S(i+m)=S(i+m)+X(i+m)$$

In addition, a counter that tracks the number of contributing pixel intensities in the row sum (e.g., nc[i]) is increased by one. Operation then continues with block 512.

In block 512, k is increased by one to move the index to the next pixel intensity value. Operation then continues with block 506, which, as discussed above, determines if the last pixel intensity value in the row has been processed. If the last pixel intensity value in the row has been processed, then operation continues with block 514.

In block 514, k is set to one and i is incremented by one. Thus, the next row of pixels is processed as operation continues with block 504. If there is no another row to be processed (i.e., all rows in the image have been processed), as determined in block 504, operation continues with block 516.

In block 516, i is set to one and, in block 518, it is determined if i is greater than M. If i is not greater than M, then operation continues with block 520. Otherwise, all rows in the image have been processed. In block 520, it is determined if the number of contributing pixels found for row i (e.g., nc[i]) during the processing from blocks 502 to 514 is greater than the threshold required for applying a correction to the row.

In block 522, if a correction is to be applied, the median of the row sums of the intensities for rows i−m to i+m (i.e., S(i−m) to S(i+m)) is determined.

In block 524, a correction value (e.g., Correction[i]) is determined for row i by the following formula:

$$\text{Correction}[i]=(S(i)-Sm)/nc[i]$$

and then the correction value is applied to each pixel in the row.

In block 526, i is incremented by one to continue processing for the next row. If there is no next row, as determined by block 518, operation then ends.

In the embodiments described above, the correction value is obtained using a median of the row sums. In other embodiments, an average of the row sums can be used to generate a correction value. Generally, using the median to generate a correction value is preferred as lines with a lot of noise are ignored. Other functions may be used depending on the particular implementation.

Figure 6:
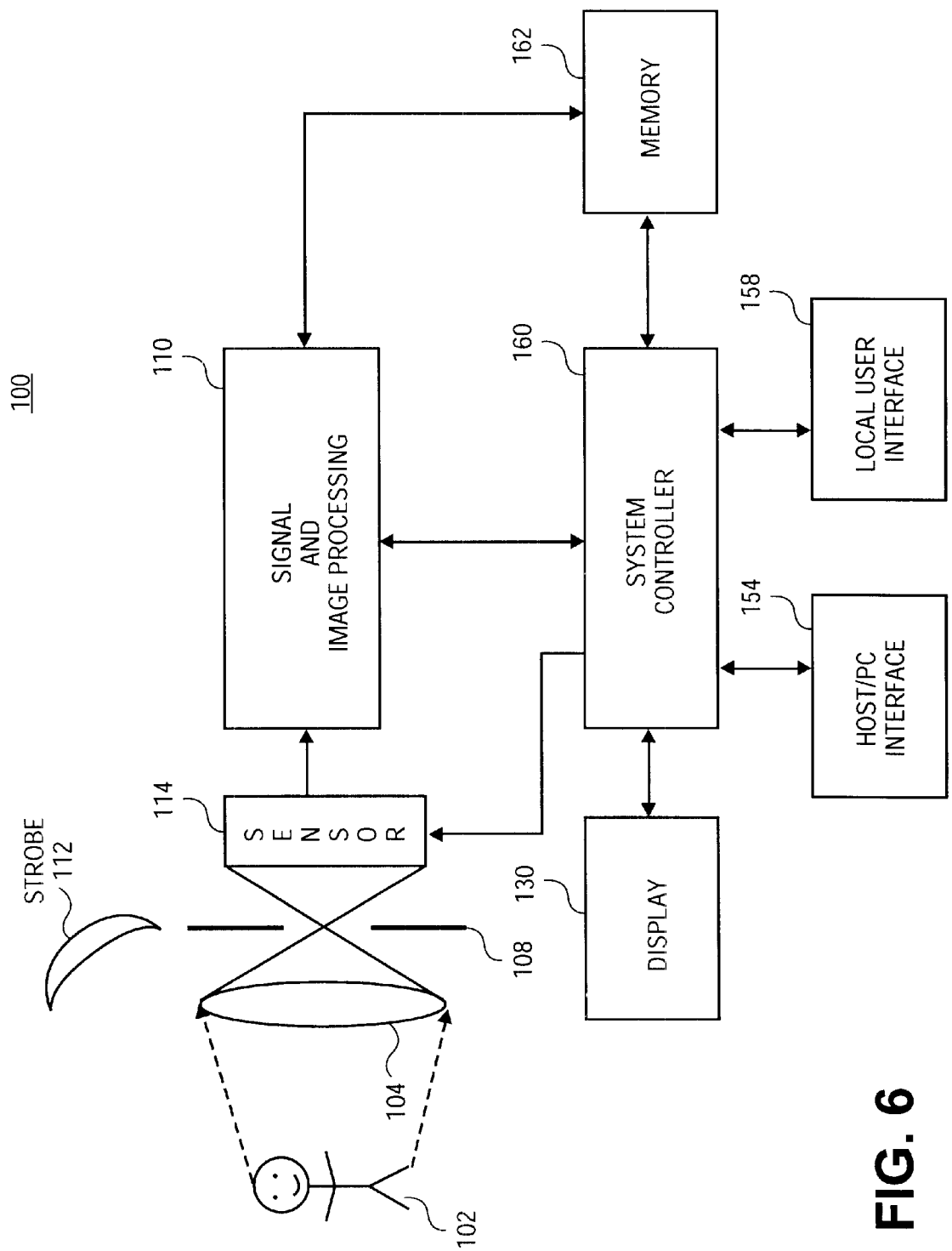
FIG. 6 is a block diagram of an imaging system configured in accordance with one embodiment of the present invention.

An embodiment of the invention included in an imaging system 100 is shown as a logical block diagram in FIG. 6. Imaging system 100 includes a number of conventional elements, such as an optical system having a lens 104 and aperture 108 that is exposed to the incident light reflected from a scene or object 102. The optical system properly channels the incident light towards a sensor array 114 that generates sensor signals in response to an image of object 102 being formed on sensor array 114. The various control signals used in the operation of sensor array 114, such as a RESET signal, a SAMPLE signal and an ADDRESS signal is generated by a system controller 160. System controller 160 may include a microcontroller or a processor with input/output (I/O) interfaces that generates the control signals in response to instructions stored in a memory such as a memory 162. In one embodiment, memory 162 which stores code/program instructions and data includes both a non-volatile programmable memory component and a volatile memory component. System controller 160 also acts in response to user input via a local user interface 158 (as when a user pushes a button or turns a knob of system 100) or a host/PC interface 154 to manage the operation of imaging system 100. The functions of controller 160 may also be implemented as a logic circuit that is tailored to generate the control signals with proper timing. Host/PC interface 154 may also transfer the captured image data to an image processing and/or viewing system such as a computer separate from imaging system 100.

Imaging system 100 contains a display 130 for displaying the captured image data. In one embodiment, imaging system 100 is a portable digital camera with display 130 as a LCD for showing the captured image data.

To obtain images, a signal and image processing block 110 is provided in which hardware and software operates according to image processing methodologies to generate captured image data in response to receiving the sensor signals. The captured image data is then stored in memory 162. In addition to storing this image data in memory 162, optional storage devices (not shown) can be used aboard system 100 for storing the captured image data. Such local storage devices may include a removable memory card.

After the captured image data is stored in memory 162, the system operates as described above to process the captured image data to remove offset noises. In another embodiment, the captured image data may be processed to remove row offset noises after the image is transferred to a host computer. For example, where the imaging system is a tethered digital camera connected to a host computer, the processing may be performed by the host computer.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A method comprising:
    determining a set of row sums for a set of pixel rows and a set of corresponding contributing pixel counts, by determining if a threshold test has been passed for each pixel in a row and adding a pixel value for each pixel in the row to a row sum for the row if the threshold test has been passed and increasing a contributing pixel count for the row;
    determining a set of row offset corrections by determining if the contributing pixel count for a row passes a second threshold test and generating a row offset correction for the row, as a function of the row sum for that row, if the second threshold test has been passed and,
    adjusting the set of pixel rows by the set of row offset corrections.

2. The method of claim 1, wherein the threshold test is determined by the following criteria:

$$|X[i-1,k]-X[i+1,k]|/(X[i-1,k]+X[i+1,k]) < \text{threshold value},$$

where i is a coordinate identifying a row position, k is a coordinate identifying a column position of a current pixel and X[i,k] is the pixel value for the pixel.

3. The method of claim 2, wherein the threshold value is 0.05.

4. The method of claim 1, wherein the threshold test is determined by the following criteria:

$$|X[i-1,k]-X[i+1,k]| < \text{threshold value},$$

where i is a coordinate identifying a row position, k is a coordinate identifying a column position of a current pixel and X(i,k) is the pixel value for the pixel.

5. The method of claim 4, wherein the threshold value is 13.

6. The method of claim 1, wherein the second threshold test is determined by the following criteria:

$$nc > \text{second threshold value}$$

where nc is the contributing pixel count for the row.

7. The method of claim 6, wherein the second threshold value is one quarter of a row length.

8. The method of claim 1, wherein generating the row offset correction comprises determining the value:

$$(S[i]-S_m)/nc$$

where i is a coordinate identifying the row, S[i] is the row sum, $S_m$ is a median of a set of row sums S[i−m] through S[i+m], and nc is the contributing pixel count for the row.

9. The method of claim 1, wherein adjusting the set of pixel rows by the set of row offset corrections comprises:
   determining if a row offset correction in the set of row offset corrections for a corresponding pixel row in the set of pixel rows is non-zero; and,
   subtracting the row offset correction from each pixel value in the corresponding pixel row if the row offset correction is non-zero.

10. An article comprising a computer readable medium having instructions stored thereon, which when executed, causes:
   determining a set of row sums for a set of pixel rows and a set of corresponding contributing pixel counts, by determining if a threshold test has been passed for each pixel in a row and adding a pixel value for each pixel in the row to a row sum for the row if the threshold test has been passed;
   determining a set of row offset corrections; and,
   adjusting the set of pixel rows by the set of row offset corrections, wherein
      evaluation of the threshold test includes the following criteria $$|X[i-1,k]-X[i+1,k]|</(X[i-1,k|+X|+1,k]) < \text{threshold value},$$

where i is a coordinate identifying a row position, k is a coordinate identifying a column position of a current pixel and X[i,k] is a pixel value for the current pixel.

11. The article of claim 10, wherein the threshold value is 0.05.

12. The article of claim 10, wherein the computer readable medium further having instructions stored thereon, which when executed, causes increasing a contributing pixel count for the row.

13. The article of claim 12, wherein the computer readable medium further having instructions stored thereon, which when executed, causes:
   determining if the contributing pixel count for the row passes a second threshold test; and,
   generating a row offset correction for the row if the second threshold test has been passed.

14. The article of claim 13, wherein the computer readable medium further having instructions stored thereon, which when executed, causes evaluation of the second threshold test as the following criteria:

$$nc > \text{second threshold value}$$

where nc is the contributing pixel count for the row.

15. The article of claim 14, wherein the second threshold value is one quarter of a row length.

16. The article of claim 13, wherein the computer readable medium further having instructions stored thereon, which when executed, causes the second threshold test to be determined by the following criteria:

$$nc > \text{second threshold value}$$

where nc is the contributing pixel count for the row.

17. The article of claim 13, wherein the computer readable medium further having instructions stored thereon, which when executed, causes determination of the value:

$$(S[i]-S_m)/nc$$

where i is a coordinate identifying the row, S[i] is the row sum, $S_m$ is a median of a set of row sums S[i−m] through S[i+m], and nc is the contributing pixel count for the row.

18. The article of claim 10, wherein the computer readable medium further having instructions stored thereon, which when executed, causes:
   determining if a row offset correction in the set of row offset corrections for a corresponding pixel row in the set of pixel rows is non-zero; and,
   subtracting the row offset correction from each pixel value in the corresponding pixel row if the row offset correction is non-zero.

19. An article of manufacture comprising;
   a machine-accessible medium having data stored thereon which, when accessed by a processor of a personal computer system, processes an image that has been captured by a digital camera and that has been transferred to the computer system, wherein the image is processed to correct for row noise, caused by random offsets, by determining whether a value, related to a difference between a pixel above a target row and a pixel below the target row and in the same column, is less than a threshold amount and if so then adding a value of a pixel that is in the same column and that is in the target row to a row sum variable for the target row and updating a count of contributing pixels for the target row, and if the count has reached a threshold amount then computing a correction value based on an average of row sum values for non-target rows and based on the target row's row sum value.

20. The article of manufacture of claim 19, wherein the medium further comprises data which when accessed by the processor applies the correction to every pixel of the target row of the image.

21. An article comprising a computer readable medium having instructions stored thereon, which when executed, determines a row sum for a pixel row of an image and a corresponding contributing pixel count, by determining if a threshold test has been passed for each pixel of the row and adding a pixel value to the row sum if the test has been passed, determines a row offset correction, and adjusts the pixel row using the correction, wherein the evaluation of the threshold test includes determining whether:

$$|[i-1,k]-X[i+1,k]| < threshold\ value,$$

where i is a coordinate identifying a row position, k is a coordinate identifying a column position of a current pixel and X[i,k] is the pixel value for the pixel.

* * * * *

UNITED STATES PATENT AND TRADEMARK OFFICE
CERTIFICATE OF CORRECTION

PATENT NO. : 6,646,681 B1
DATED : November 11, 2003
INVENTOR(S) : Macy et al.

It is certified that error appears in the above-identified patent and that said Letters Patent is hereby corrected as shown below:

Column 5,
Line 15, after "amount", insert -- (e.g. 13) --.

Column 9,
Line 58, delete "|X[i-1,k]i-X[i+1,k]|</(X[i-1,k|+X|+1,k]) < threshold value,",
insert -- |X[i-1,k]-X[i+1,k]|/(X[i-1,k]+X[i+1,k]) < threshold value, --.

Column 12,
Line 4, delete "| [i-1,k]-X[i+1,k]| < threshold value,", insert -- |X[i-1,k]-X[i+1,k]| < threshold value, --.

Signed and Sealed this

Second Day of March, 2004

JON W. DUDAS
*Acting Director of the United States Patent and Trademark Office*